April 7, 1931. E. SODERGREN 1,799,605
GAUGING INSTRUMENT FOR MITER BOXES
Filed Feb. 6, 1928 2 Sheets-Sheet 1
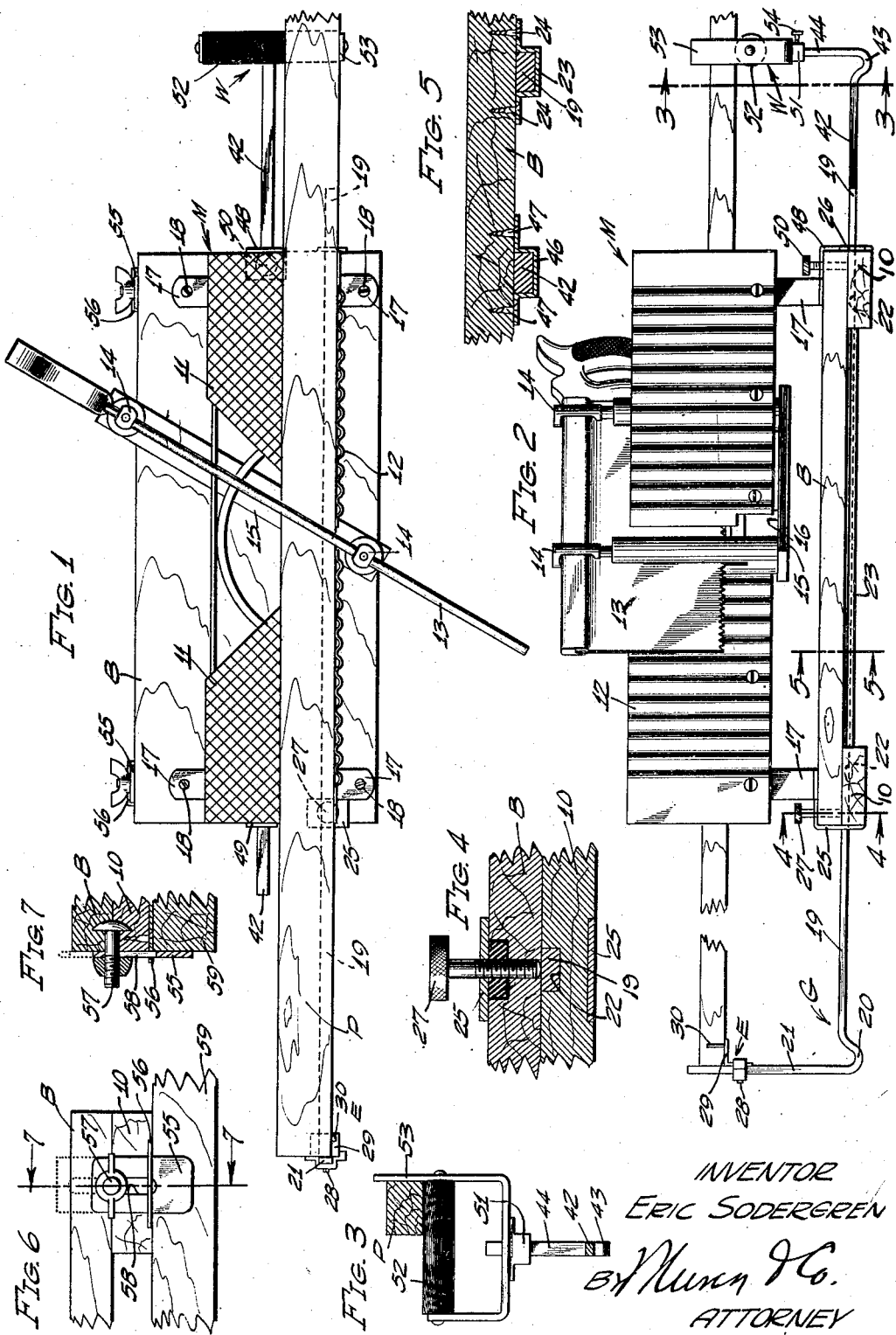
INVENTOR
ERIC SODERGREN
BY Munn & Co.
ATTORNEY April 7, 1931.   E. SODERGREN   1,799,605
GAUGING INSTRUMENT FOR MITER BOXES
Filed Feb. 6, 1928   2 Sheets-Sheet 2
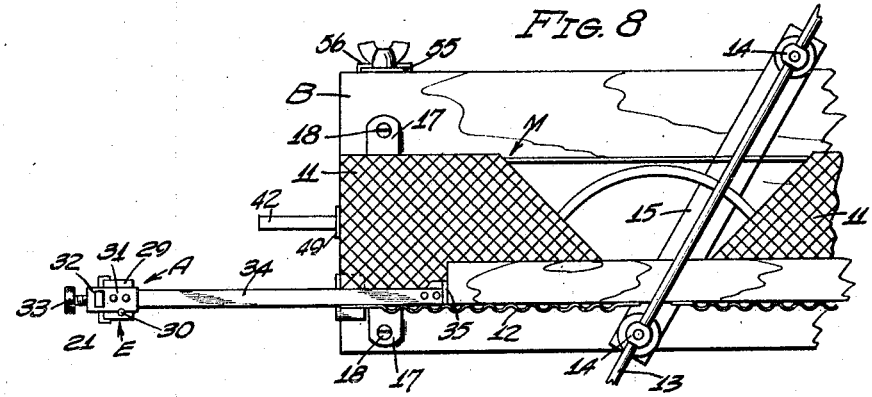
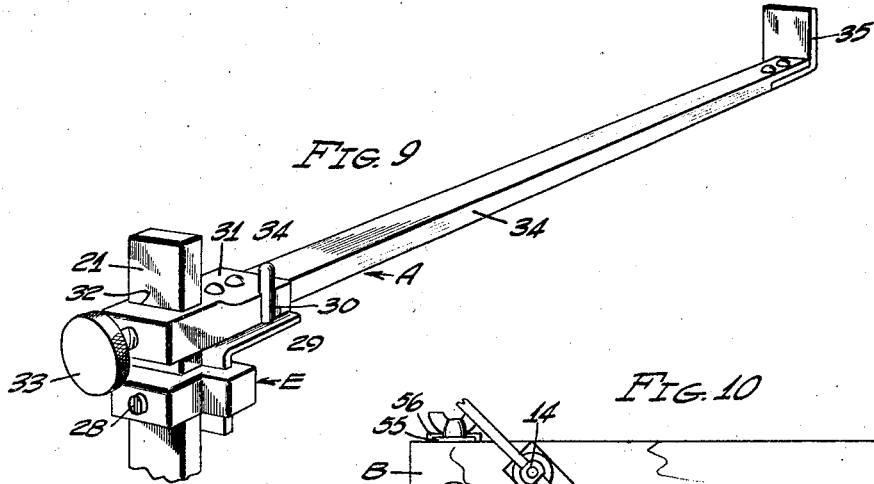
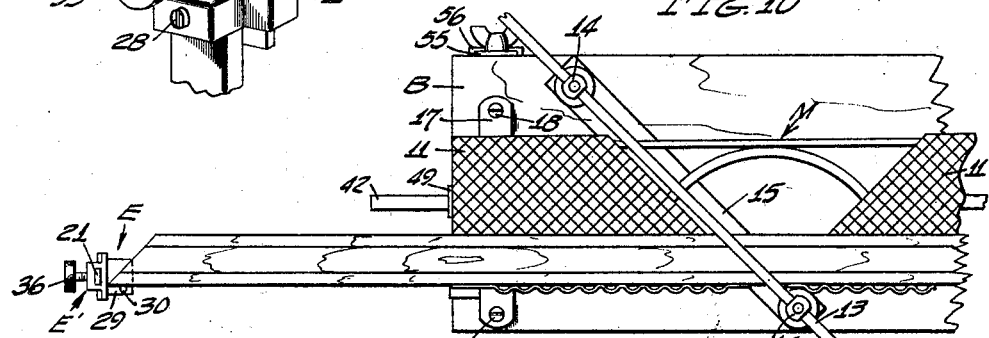
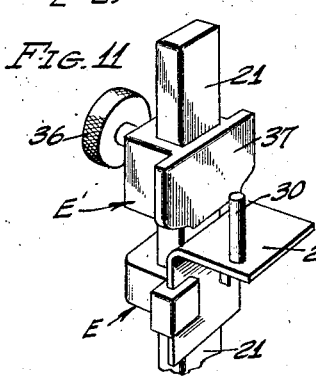
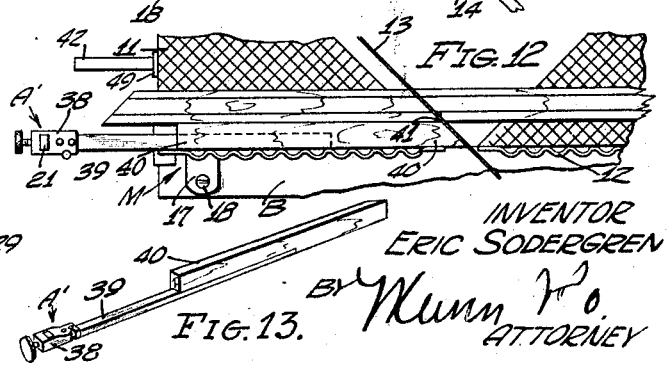
INVENTOR
ERIC SODERGREN
ATTORNEY Patented Apr. 7, 1931

1,799,605

UNITED STATES PATENT OFFICE

ERIC SODERGREN, OF SIERRA MADRE, CALIFORNIA

GAUGING INSTRUMENT FOR MITER BOXES

Application filed February 6, 1928. Serial No. 252,265.

My invention relates to and has for a purpose the provision of a simple and substantial gauging instrument by which a piece of material to be sawed in a miter box can with the utmost ease and dispatch, be accurately gauged with respect to the saw of the miter box, for sawing to any predetermined dimension within the range of the instrument.

It is another purpose of my invention to provide a gauging instrument with which any conventional form of miter box is capable of being operatively associated to form a unitary and portable structure without in any way modifying the construction of the miter box, and which is adjustable in a manner to compensate for miter boxes of different dimensions, thus extending to a maximum the range of usefulness of the instrument.

It is a further purpose of my invention to provide a gauging instrument having means by which pieces of molding for picture frames and the like, having one end thereof previously mitered can be accurately gauged for sawing of a miter at the other end thereof.

Another purpose of my invention is the provision of a gauging instrument having means by which a piece of material to be mitered, such as, for instance, panel molding, can be accurately positioned with respect to the saw of the miter box so as to insure that the miter will be sawed at the exact point required.

Still another object of my invention is the provision of a gauging instrument having associated therewith a work holder by means of which a piece of material of such dimensions as to project from an end of the miter box and bend downwardly under its own weight sufficiently to interfere with the accurate gauging of the piece, can be supported at a distance from the miter box and in the same plane as that portion of the piece directly supported by the miter box, to the end that the accurate gauging of the piece will be insured.

I will describe only one form of gauging instrument for miter boxes embodying my invention and will then point out the novel features in claims.

In the accompanying drawings,

Fig. 1 is a view showing in plan one form of gauging instrument embodying my invention applied to a conventional form of miter box, and illustrating the instrument in gauging position with respect to a piece of material to be sawed;

Fig. 2 is a view in side elevation of the gauging instrument and miter box shown in Fig. 1;

Fig. 3 is a sectional view taken on the line 3—3 of Fig. 2, looking in the direction of the arrows and illustrating the construction of the work support embodied in the instrument and the manner in which a piece of work is adapted to be associated therewith;

Figs. 4 and 5 are enlarged sectional views taken respectively on the lines 4—4 and 5—5 of Fig. 2 and looking in the direction of the arrows;

Fig. 6 is an enlarged fragmentary view illustrating one of a plurality of stops embodied in the instrument;

Fig. 7 is a sectional view taken on the line 7—7 of Fig. 6 and looking in the direction of the arrows;

Fig. 8 is a fragmentary plan view of a miter box and a gauging attachment embodied in the gauging instrument, and illustrating the manner in which the attachment is employed to gauge a piece of material from which a relatively small portion is to be sawed;

Fig. 9 is a perspective view of the gauging attachment shown in Fig. 8 and illustrating the manner in which it is adapted to be supported by the gauging instrument;

Fig. 10 is a fragmentary plan view of a miter box and an attachment embodied in the gauge, for use in gauging a piece of molding having an end thereof previously mitered;

Fig. 11 is a perspective view of the attachment shown in Fig. 10, and illustrating the manner in which it is adapted to be supported by the gauging instrument;

Fig. 12 is a fragmentary plan view of a miter box and another attachment by which the accurate positioning of a piece of panel molding or the like, with respect to the saw of the miter box, for mitering at a predetermined point, is greatly facilitated; and Fig. 13 is a perspective view of the attachment shown in Fig. 12.

Referring specifically to the drawings in which similar reference characters designate similar parts in each of the several views, my invention in its present embodiment comprises a gauging instrument including a base B of rectangular form, preferably constructed of wood and having transversely extending strips 10 secured thereto at its ends and constituting feet for supporting the base in elevated position on a work bench or other suitable support.

Upon the base B is adapted to be mounted a conventional form of miter box M including a bed or saw table 11 from one longitudinal edge of which projects upwardly a back rest 12 adapted to co-act with the bed in supporting a piece of material in a definite position for sawing by a saw 13 mounted to reciprocate in slotted guide posts 14 secured to a frame 15 pivotally mounted at 16 to permit the angular adjustment of the saw with respect to the work, all of which is well known and will be understood. The miter box M illustrated is provided with attaching ears 17 by means of which the box is ordinarily secured to a work bench. However, when used in conjunction with my gauging instrument these ears 17 are utilized to permanently secure the miter box to the base B, and to this end screws 18 extending through the ears are threaded into the base so that the miter box and base become a single unit and can be moved about on the work bench as desired.

To provide means for gauging an extremity of a piece of material supported on the bed 11, with respect to the saw 13, and to support the extremity of the piece in the same plane as that portion of the piece supported by the bed, a gauge member designated generally at G is provided. In the present instance, the gauging member G comprises a bar 19 of rectangular cross section bent downwardly adjacent one end to provide a foot 20 adapted to rest on the work bench, and then bent upwardly to provide an upstanding portion 21. The bar is slidably mounted in alined grooves 22 formed in the strips 10 and extending longitudinally of the base, and in a channel shaped housing 23 spanning the strips and secured to the underside of the base by screws 24. With the bar mounted in this manner, its upstanding portion 21 projects above the plane of the bed 11 and constitutes an abutment against which an extremity of a piece of material P is adapted to abut for gauging of that portion of the material to be sawed from the latter, with respect to the saw 13, as is clearly shown in Figs. 1 and 2.

A U-shaped guide member 25 is secured to one end of the base B and is provided with an opening slidably receiving the bar 19 while a guide plate 26 is secured to the opposite end of the base and is provided with an opening through which the bar 19 is adapted to extend. Threaded into the U-shaped guide member 25 is a clamping screw 27 adapted to be screwed into clamping engagement with the bar 19 so as to lock the latter in a selected position of adjustment for gauging of a particular piece of work by the upstanding portion 21.

To position the extremity of the piece of work being gauged, in the plane of the bed 11 and back rest 12 of the miter box M so as to insure the extreme accuracy of the gauging operation, I provide an element E in the form of a block of metal slidably mounted on the upstanding portion 21 and capable of being locked in a selected position of vertical adjustment by a screw 28. The element E is provided with a pair of co-acting projections, one of which is in the form of a horizontally disposed shelf 29 and the other in the form of a pin 30 projecting vertically upward from the shelf. The element E is adjusted on the upstanding portion 21 until the top surface of the shelf 29 is disposed in alinement with the top surface of the bed 11, while the position of the pin 30 on the shelf is such that one side thereof is alined with the side of the back rest 12 against which the piece of material to be sawed is adapted to abut. With the extremity of the piece of material reposing on the shelf 29 and engaging the pin 30, it will be clear that the extremity will be supported in the same vertical and horizontal plane as that portion of the piece resting on the bed and against the back rest of the miter box, respectively, thus preventing distortion of the extremity which would render the sawing of the piece inaccurate.

The vertical adjustability of the element E allows for variations in height of beds of different miter boxes so that the instrument can be operatively associated with miter boxes of different dimensions with equal facility.

As the instrument above described is limited in its gauging function to pieces of material to be sawed into such lengths that the extremity thereof being gauged projects from the end of the bed 11, I provide an attachment (Figs. 8 and 9) by which pieces of less length can be accurately gauged. This attachment comprises a member A having a head 31 provided with an opening 32 conforming to the size and cross-section of the upstanding portion 21 so that the head can be applied to the latter as shown in Fig. 9 to rest upon the shelf 29 and be locked to the upstanding portion by a screw 33. The head 31 is provided with a notch 34 engaged by the pin 30 so that the head will be firmly supported against displacement. From the head projects a bar 34 provided at its free end with an abutment 35 capable of functioning with respect to the extremity of the piece of material, in the same manner as the upstanding portion 21. With the member A applied to the upstanding portion as shown in Figs. 8 and 9, it will be clear that upon sliding adjustment of the gauging member G in the base B, the member A can be moved to a position in which it overlies and rests upon the bed 11 so that its abutment 35 can be brought in any proximity to the saw 13 desired.

In order to provide a suitable abutment for one mitered end of a piece of picture frame molding or the like, when it is desired to gauge the latter for the sawing of a miter on its other end, an attachment comprising an element E′ (Figs. 10 and 11) in the form of a block of metal is provided with an opening adapted to slidably receive the upstanding portion 21 and to be securely clamped thereto by means of a screw 36, the element having a vertical face 37 of such dimensions as to project laterally beyond the side edges of the upstanding portion 21 when the element is applied to the latter so that the end portion of the molding, as shown in Fig. 10, can be rested upon the shelf 29 and against the pin 30, while its pointed extremity will abut the face 37, thus insuring that an accurate gauging of the molding will be effected.

In order to facilitate the accurate positioning, with respect to the saw 12, of a piece of panel molding previously marked for sawing of a miter at a predetermined point thereon, I provide an attachment (Figs. 12 and 13) comprising a member A′ having a head 38 identical in construction to the head 31 of the member A and adapted to be associated with the upstanding portion 21 in a manner identical to the latter member. From the head 38 projects a bar 39 to which is secured an extension 40 formed of wood and having its free end beveled to conform with the angle of the particular miter to be sawed on the molding. In the operation of this attachment it is applied to the upstanding portion 21 as shown in Fig. 12 and the gauging member G adjusted to position the beveled end of the extension 40 against the side of the saw 13. The saw is now elevated to allow the piece of panel molding to be inserted beneath, and a mark previously made on the molding at the point it is desired to saw off the latter is alined with the point of juncture 41 between the beveled end of the extension and the side of the latter against which the molding rests, after which the molding is held by the operator against movement and the sawing operation effected.

In the event that a piece of material being gauged at one extremity by the gauging member G is of such length that its other extremity projects beyond the opposite end of the bed 10 to such an extent as to cause the projecting portion of the piece to bend downwardly under its own weight and thus interfere with the accuracy of the gauging operation, a work holder designated generally at W, is embodied in the gauging instrument.

The work holder in the present instance comprises a bar 42 of rectangular cross-section bent downwardly adjacent one end to provide a foot 43 adapted to rest on the work bench, and then bent upwardly to provide an upstanding portion 44. The bar 42 is slidably mounted in alined grooves (not shown) formed in the strips 10 extending longitudinally of the base B similarly to the grooves 22, and in a channel shaped housing 46 spanning the strips and secured to the underside of the base by screws 47.

A U-shaped guide member 48 is secured to the end of the miter box opposite to that with which the gauging instrument is associated and is provided with an opening slidably receiving the bar 42, while a guide plate 49 is secured to the other end of the base and is provided with an opening through which the bar 42 is adapted to extend. Threaded into the U-shaped guide member 48 is a clamping screw 50 adapted to be screwed into clamping engagement with the bar 42 so as to lock the latter in a selected adjusted position.

Upon the upstanding portion 44 is slidably mounted for vertical adjustment a yoke 51 in the vertical arms of which is journaled horizontally and on an axis transverse to the length of the base B, a roller 52. One of the arms 53 of the yoke is extended above the roller as shown in Fig. 3, and is adapted to co-act with the roller in supporting the projecting portion of the piece of material in the same horizontal and vertical plane as that portion of the piece supported directly by the bed 11 and abutting the back rest 12 of the miter box.

The yoke 51 can be locked in any vertically adjusted position by means of a screw 54, and this adjustability of the yoke allows for variations in height of beds of different miter boxes so that the work holder is rendered capable of being operatively associated with miter boxes of different dimensions. The adjustability of the bar 42 longitudinally of the bed 11 permits the roller 52 to be positioned at the point most effective to support the projecting portion of the piece of material being gauged.

A pair of stops 55, identical in construction, are slidably mounted for vertical movement in slotted plates 56 secured to the underside of the base B along one longitudinal edge thereof and adjacent each end, and studs 57 secured in the base B extend through slots 58 in the stops and are provided with wing nuts by means of which the stops can be clamped in the inactive position shown in broken lines in Fig. 6 or the active position shown in full lines in this figure in which the stops project below the underside of the strips 10. In the active position of the stops they are adapted to engage the front edge of a work bench 59 so that during the sawing operation upon a piece of material in the miter box M, the tendency of the miter box to move away from the operator will be resisted, and such movement positively prevented by the stops.

Although I have herein shown and described only one form of gauging instrument for miter boxes embodying my invention, it is to be understood that various changes and modifications may be made therein without departing from the spirit of the invention and the spirit and scope of the appended claims.

I claim:

1. In combination, a miter box on which a piece of material is adapted to be supported in a position for sawing by the saw of the miter box, a gauging instrument operatively associated with the miter box, having gauging means against which an extremity of the piece of material is adapted to abut so as to gauge the dimension of the piece between the gauging means and the saw of the miter box, and means by which said extremity of the piece of material and a side of the latter is adapted to be supported in the same plane both horizontally and vertically as that portion of the piece of material supported by the miter box, whereby said dimension of the piece of material can be accurately gauged.

2. In combination, a miter box having a bed upon which a piece of material to be sawed is adapted to rest, and a back rest against which the piece is adapted to abut so as to co-operate with the bed in supporting the piece in a definite position for sawing by the saw of the miter box, and a gauging instrument for the miter box comprising a base upon which the miter box is secured, and a gauging member mounted on the base, having means against which an extremity of the piece is adapted to abut, and be supported in the plane of the bed and back rest of the miter box, whereby an accurate gauging of the piece can be effected.

3. In combination, a miter box having a bed upon which a piece of material to be sawed is adapted to rest, and a back rest against which the piece is adapted to abut so as to co-operate with the bed in supporting the piece in a definite position for sawing by the saw of the miter box, and a gauging instrument for the miter box comprising a base upon which the miter box is secured, and a gauging member comprising a bar slidably mounted in the base for adjustment longitudinally of the bed and projecting from one end of the base, the bar having an upstanding portion constituting a stop against which an extremity of the piece of material is adapted to abut for gauging of the piece with respect to the saw of the miter box, an element secured to the upstanding portion, having horizontal and vertical projections co-operating to support and position the extremity of the piece in the plane of the bed and back rest of the miter box, and means for securing the bar in a selected position of adjustment.

4. A gauging instrument comprising a base upon which a miter box is adapted to be secured, a gauging member comprising a bar slidably mounted in the base and having a portion against which an extremity of a piece of material supported by the miter box is adapted to abut, means on said portion by which the extremity of the piece of work is adapted to be supported and positioned in the same plane both horizontally and vertically as that portion of the piece supported by the miter box, and means for securing the bar against sliding movement in the base.

5. A gauging instrument as embodied in claim 4 wherein said first means comprises an element secured to said portion and having a pair of projections, on one of which the under side of the piece of material is adapted to rest, and against the other of which a side of the piece of material is adapted to abut.

6. A gauging instrument comprising a base upon which a miter box is adapted to be secured, a gauging member comprising a bar slidably mounted in the base and having a portion against which an extremity of a piece of material supported by the miter box is adapted to abut, means on said portion by which the extremity of the piece of work is adapted to be supported and positioned in the same plane as that portion of the piece supported by the miter box, and means for securing the bar against sliding movement in the base, said first means comprising an element secured to said portion and having a horizontally disposed shelf and a pin projecting upwardly from the shelf.

7. A gauging instrument comprising a base upon which a miter box is adapted to be secured, a gauging member comprising a bar slidably mounted in the base and having a portion against which an extremity of a piece of material supported by the miter box is adapted to abut, means on said portion by which the extremity of the piece of work is adapted to be supported and positioned in the same plane as that portion of the piece supported by the miter box, and means for securing the bar against sliding movement in the base, said first means comprising an element secured to said portion and having a horizontally disposed shelf and a pin projecting upwardly from the shelf, a member comprising a bar having a head at one end provided with an opening adapted to receive said portion and a notch adapted to co-act with said pin, and means for securing the head to said portion.

8. A gauging instrument comprising a base on which a miter box is adapted to be secured, a gauging member comprising a bar slidably mounted in the base, the bar having an upstanding portion against which an extremity of a piece of material is adapted to abut for gauging of the piece with respect to the saw of the miter box, and an element on the upstanding portion having horizontal and vertical projections so disposed as to be capable of co-operating to support and position the extremity of the piece of material in the same plane as the bed and back rest of the miter box.

9. A gauging instrument comprising a base upon which a miter box is adapted to be secured, a gauging member comprising a bar slidably mounted in the base and having a portion against which an extremity of a piece of material supported by the miter box is adapted to abut, means on said portion by which the extremity of the piece of work is adapted to be supported and positioned in the same plane both horizontally and vertically as that portion of the piece supported by the miter box, and means for securing the bar against sliding movement in the base, said base comprising a flat elongated body, having strips constituting feet extending transversely across its ends, the strips having alined grooves extending longitudinally of the base, in which said bar is slidably received to underlie the base, a channel shaped housing secured to the base and in which the bar is slidably receive and guided, a U shaped member receiving one end of the base and one of the strips and having an opening for receiving the bar, said means for securing the bar against sliding movement comprising a set screw threaded into said U shaped member and adapted to engage the bar.

Signed at Los Angeles, in the county of Los Angeles, and State of California this 26th day of January, A. D. 1928.

ERIC SODERGREN.